May 9, 1933.  J. C. ALBRIGHT  1,908,396

PISTON

Filed Sept. 24, 1930

Inventor:
Joseph C. Albright,
BY Charles E. Tullar
ATTORNEY

Patented May 9, 1933

1,908,396

UNITED STATES PATENT OFFICE

JOSEPH C. ALBRIGHT, OF CLEVELAND HEIGHTS, OHIO, ASSIGNOR TO BAILEY METER COMPANY, A CORPORATION OF DELAWARE

PISTON

Application filed September 24, 1930. Serial No. 484,105.

This invention relates to improvements in pistons, and has more particular reference to piston and cylinder mechanisms wherein it is desirable to position axially either the piston or the cylinder relative to the other, and is directed towards overcoming resistance to such positioning.

While the principle of my invention may be embodied in pistons adapted for various purposes, I have chosen to illustrate and describe those pistons commonly termed "pilots" in pilot valve mechanisms. Such pilots are used for controlling the passage of hydraulic fluid to and from a hydraulic power device.

Pilot valves are used to control hydraulic power to the end that a relatively small control force is amplified, and a relatively greater force is made available to perform useful work. The force available for positioning the pilot is often so small that dirt, filings, sediment or like material or corrosion would offer sufficient resistance to prevent or retard movement of the pilot.

One object of my invention is to provide a rotating piston which will tend to overcome resistance to axial movement, the means by which the piston is rotated preferably a part of the hydraulic fluid of the system.

Another object is to so construct the piston that it is self-cleaning, to the end that dirt, chips, etc. will not be allowed to accumulate.

Still another object is to provide a piston which will free itself for axial movement in case it tends to become caught or wedged in one position.

With these and further objects in view I will describe one embodiment of my invention:

Figure 1:
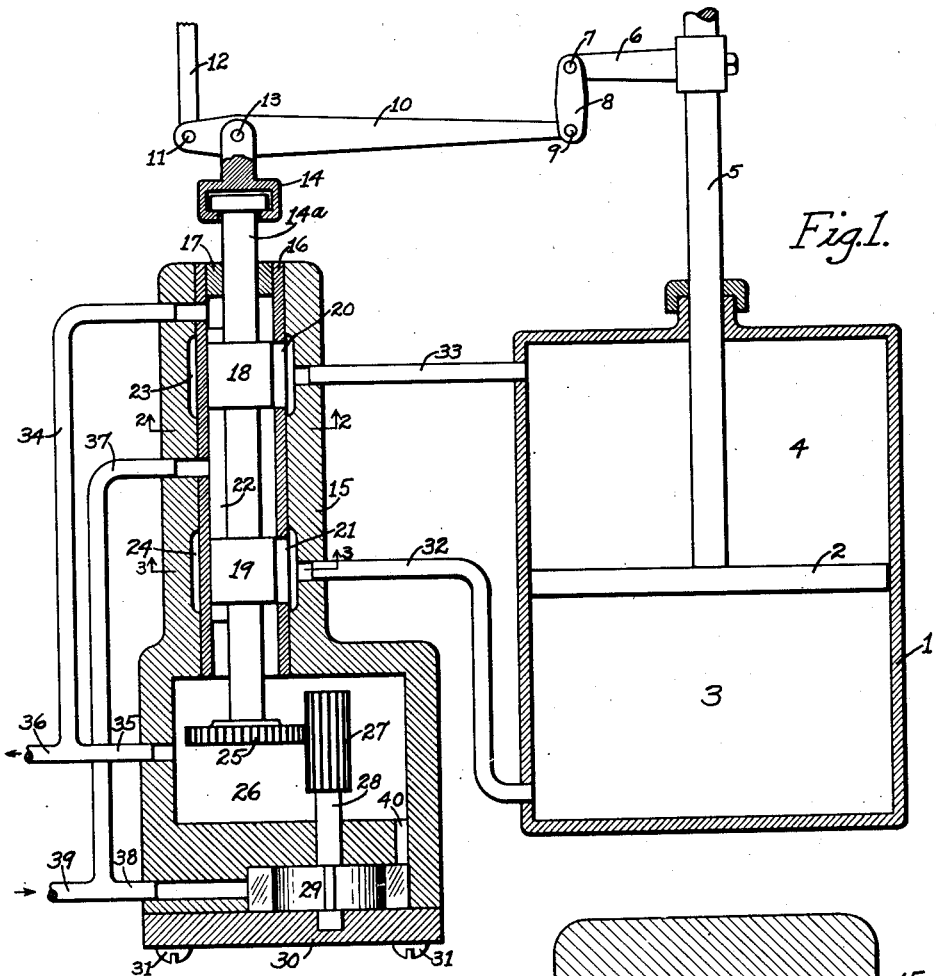
Fig. 1 is a partially sectioned drawing of a pilot valve assembly and hydraulic power device with necessary inter-connections.

Referring to Fig. 1, I have indicated at 1 the cylinder of a hydraulic power device in which is positioned a piston 2 having fastened to it a piston rod 5 passing through the head of the cylinder 1 and moved by the piston 2 for the accomplishment of useful work. The piston 2 divides the cylinder 1, which has closed ends, into two chambers, designated 3 and 4, adapted to enlarge the one at the expense of the other, through movement of the piston axially in the cylinder.

To regulate the passage of hydraulic fluid to the cylinder 1 for moving the piston 2, is shown a pilot valve assembly wherein a pilot positioned axially relative to its casing by a comparatively weak control force, allows hydraulic fluid to pass to or from the chambers 3 and 4 when a change in the position of the piston rod 5 is called for to satisfy a factor whose variation produces the control force.

The pilot valve assembly as illustrated comprises a casing 15, through a relatively long section of which extends a smoothly bored hole opening at the upper end to atmosphere and at the lower end to a chamber 26. Within the smoothly bored hole is a bushing 16 in which operates a pilot 14a having two cylindrical enlargements designated at 18 and 19, spaced apart and from the ends of the pilot, known as "lands". In the bushing 16 are a series of holes or ports 20, and a series of holes or ports 21, spaced apart longitudinally of the bushing as are the lands 18 and 19 on the pilot, to the end that when the pilot is in a normal position, the land 18 is opposite the ports 20, and the land 19 is opposite the ports 21. Closing the space between the pilot 14a and the bushing 16 at the upper end of the bushing 16 is a bushing 17 which also serves to journal the pilot 14a.

The ports 20 in the bushing 16 open into an annular chamber 23 in the casing 15, and through a pipe 33 are in communication with the chamber 4 of the cylinder 1. Likewise the ports 21 in the bushing 16 open into an annular chamber 24 in the casing 15 and through a pipe 32 are in communication with the chamber 3 of the cylinder 1.

It is known to those familiar with the art that hydraulic fluid admitted to the interior of the bushing 16 may be allowed to pass to one or the other of the chambers 3 or 4 of the power cylinder 1, if the pilot 14a is moved axially until passage is opened to the ports 20 or to the ports 21 around the land 18 or the land 19. Simultaneous with the uncovering of one row of ports into communication with the space between the lands on the pilot, the other row of ports will be allowed to communicate with that part of the interior of the bushing 16 beyond the land 18 or the land 19 for draining hydraulic fluid from the chamber 3 or 4 which is to decrease in size. A pipe 37 is shown to supply hydraulic fluid, and pipes 34, 35 and 36 to drain.

The control force available for axially positioning the pilot to allow the passage of hydraulic fluid may be relatively weak. Frequently such a pilot will become stuck in one position so that the control force will not be sufficient to move it. Such resistance to axial positioning may be from the presence of dirt or sediment upon the wall of the chamber within which the pilot is to move, or after the pilot has moved a certain distance, a chip or other piece of foreign matter may become lodged between the edge of a land and the edge of a port, so that the land cannot position back and shut off the flow of fluid through the port. Corrosion or erosion may roughen up the surface of the chamber, or the pilot stem may actually become bent or strained so that an edge of a land may become caught in an edge of a port and prevent its moving.

Through my invention I tend to overcome resistance to axial positioning, and I have found that by rotating such a pilot it is made freer for positioning than if it were not rotated. In the drawing is shown a preferred means of rotation wherein the pilot 14a carries on its lower end a gear 25 which meshes with a pinion 27 having a greater length of tooth than the gear 25, allowing for the meshing of the two, even though the pilot 14a is moved lengthwise relative to the pinion 27. The pinion 27 is carried by a short shaft 28 journaled in a part of the casing 15 and rotated by a fluid motor 29 which I have shown as operating from oil or other hydraulic fluid supplied through the pipe 38 which is a branch of the supply pipe 39; another branch 37 leading to the pilot chamber. The hydraulic fluid used to rotate the motor 29 is a part of that supplied for passage through the pilot to the cylinder 1 as a motive power of the piston 2. I have shown a drain of fluid from the motor 29 through the passage 40 to the chamber 26, where it joins the drain from the pilot chamber and leaves the casing 15 through the branch 35 and pipe 36 to the sump at the source of supply or other point. The lower end of the short shaft 28 is shown as journaled in the plate 30, held to the casing 15 by the screws 31.

To allow for rotation of the pilot 14a and at the same time allow its being positioned axially, a head on the upper end of the pilot is carried by a universal connection 14 suspended at a pivot point 13 to a lever 10. One end of the lever 10 is connected at 11 with the rod 12, through which is applied the relatively small control force. It will be seen that if the rod 12, through variation in a factor which is to be controlled, is moved upward or downward, it will in turn through the intermediary of the lever 10 move the head 14 upward or downward a predetermined amount and correspondingly, move the pilot 14a axially in its casing even while the pilot is rotating.

As is known in the art, the pilot illustrated and described is of a type that must be positioned back to its original location of the lands relative to the ports to shut off the passage of hydraulic fluid after a desired change has been made in the position of the piston 2 relative to its cylinder. To accomplish this, one end of the lever 10 is pivoted at 9 to a short link 8 which is pivoted at 7 to a projection 6 from the piston rod 5. Thus when an initial motion vertically of the pilot 14a uncovers the ports to allow passage of hydraulic fluid to the cylinder 1 and movement of the piston 2, said movement of the piston 2 acting through the projection 6 and the lever 10, repositions the pilot 14a to cut off the flow of hydraulic fluid through the ports.

As explained before, some foreign matter may become wedged between the edge of a land and the edge of a port, or the pilot stem may become bent or sprung, or accumulation of foreign matter on the walls of the pilot casing may introduce a serious resistance to axial positioning of the pilot. Beside rotating the pilot to overcome such resistance, I have provided on the pilot, and rotating with the pilot, a fin indicated at 22 extending axially of the pilot between the lands and beyond the lands and radially from the center of the pilot a distance equal to the radius of the lands 18 and 19, which upon rotation within the pilot casing will tend to scrape off from the walls of the casing any accumulated sediment, dirt or other foreign matter. At the same time it will tend to cut out any chips or other foreign matter lodged between an edge of a land and the opening of a port. Also if the pilot stem is bent or sprung out of its proper position, the fin 22 will upon each revolution center up the pilot and free it from an engagement of the land with a port so that the pilot can be moved axially relative to its casing if such a movement is called for by the control force acting upon the rod 12.

Figure 2:
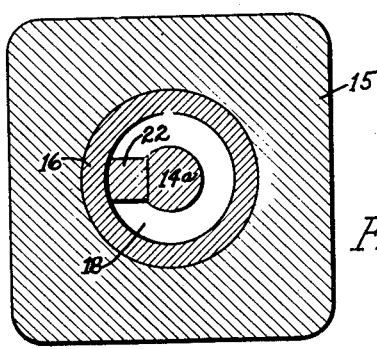
Fig. 2 is a section in the direction of the arrows along the line 2—2 of Fig. 1, but illustrates a different condition in operation than that illustrated in Fig. 1.
Figure 3:
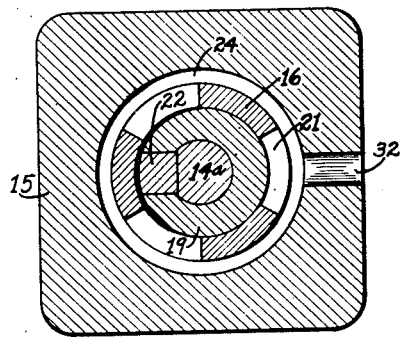
Fig. 3 is a section in the direction of the arrows along the line 3—3 of Fig. 1, but illustrating the same condition of operation as Fig. 2.

In Figs. 2 and 3 I have shown in each a section taken through the assembly of the pilot casing in Fig. 1, but I have distorted these views in a way to show the condition that would exist if, for example, the land 18 had become moved into one of the ports 20, and the land 19 into one of the ports 21, thereby catching an edge of the land on the edges of the ports so that the pilot assembly could not be moved axially relative to its casing. In Figs. 2 and 3 it will be seen that the pilot assembly is shown eccentric with the center of the casing 15, and that the land 18, for example, as shown in Fig. 2, is moved over into engagement with port opening 20, and in Fig. 3 the land 19 is caught in the opening of the port 21.

In operation, the piston rod 5 moves a damper, valve or other mechanism (not shown) for controlling a factor whose variations from a predetermined value produce a control force relatively weaker than the force applied through the piston rod 5. Said relatively weaker control force applied to the rod 12 positions the rod 12 vertically in direction and in amount depending upon the variation of the factor from the predetermined value. The vertical positioning of the rod 12 results in an axial positioning of the pilot 14a and allows passage of hydraulic fluid through the ports 20 and 21.

If for example the pilot 14a has been moved downward, then the land 18 moving downward out of alignment with the ports 20, allows passage of hydraulic fluid from the chamber 4 of the cylinder 1, through the pipe 33, the port 20, around the upper edge of the land 18 and through the pipe 34 to drain. Simultaneously, the downward movement of the pilot 14a has moved the land 19 from alignment with the ports 21, allowing passage of hydraulic fluid from the supply pipe 37 past the land 19, through the ports 21 and the pipe 32 to the chamber 3 of the cylinder 1, resulting in a vertical upward movement of the piston 2 and with it the piston rod 5, so long as such condition persists.

As soon, however, as the piston 2 and with it the piston rod 5 begins to move upward, the projection 6 moving with the piston rod 5 and working through the linkage begins to raise the pilot 14a and return to alignment the lands 18 and 19 with the ports 20 and 21, thereby gradually shutting off the passage of hydraulic fluid. This operation is well known to those familiar with the art, and accomplishes a positioning of the piston rod 5 and correspondingly of the mechanism it operates to control the factor whose variation has called for a change.

The advantages obtained through my invention are primarily in keeping the pilot 14a free for axial positioning by the relatively weak control force applied at 12, and I have found that a pilot which is continuously rotated will be maintained free for such axial positioning whereas one which is not so rotated might upon a long period of non-axial movement freeze or become highly resistant to axial positioning. In providing a deliberate means of rotation which in this embodiment is shown as a fluid motor utilizing part of the fluid supplied to the pilot assembly, I have the advantage of being able to locate the pilot assembly at practically any desired point.

I have through the addition to the pilot assembly of the fin 22 a means for scraping from the walls of the pilot casing any accumulated dirt or sediment, or cutting chips or foreign matter which might be lodged between an edge of a land and an edge of a port or freeing a land from engagement with a port opening in case one should be caught in such a manner, and in such manner tend at all times to keep the pilot free for axial positioning by a relatively weak control force.

I have described the operation of one embodiment of my invention as using oil for a hydraulic medium, but it is obvious that water or some other fluid may be so used and that other means of rotating the pilot than a hydraulic motor may be employed. Likewise the construction details may vary widely from those illustrated and described without departing from the spirit of the invention. For instance, the pilot might be of a single land type, the system being of a loading pressure, single conduit design wherein a fluid pressure on one side of the hydraulic piston acts against a spring or other loading means.

My invention may be applied to other types of pistons or cylinders where one or the other may be rotated and where a fin of the type described and claimed may be applied for cleaning off dirt, chips, etc., all for the purpose of overcoming resistance to axial positioning.

It is expressly understood that by illustrating and describing one embodiment of my invention I have not limited the invention other than as stated in the claims in view of prior art.

What I claim as new and desire to secure by Letters Patent of the United States, is:—

1. The combination of a cylinder member, a piston member, means for positioning one of said members axially relative to the other, and means carried by the piston which upon movement of one of the members relative to the other frees for axial positioning, from a constrained position, one of the members relative to the other.

2. The combination of a cylinder member, a piston member, means for positioning one of said members axially relative to the other, means for rotating one of the members relative to the other, and means carried by the piston which upon rotation of one of the members relative to the other scrapes the wall of the cylinder member tending to loosen or remove foreign matter.

3. The combination of a cylinder member, a piston member, means for positioning one of said members axially relative to the other, means for rotating one of the members relative to the other, and means carried by the piston which upon rotation of one of the members relative to the other frees for axial positioning, from a constrained position, one of the members relative to the other.

4. In combination, a casing, a rotating pilot having lands, means for positioning the pilot axially relative to the casing, a fin on the pilot having a sharp cutting edge parallel to the axis of the pilot, extending longitudinally of the pilot, between and beyond the lands of the pilot, projecting in a direction radial to the center of the pilot a distance equal to the radius of the lands and tending upon rotation with the pilot to loosen or remove foreign matter from the wall of the casing.

5. In combination, a casing, a pilot having lands, means for positioning the pilot axially relative to the casing, a fin on the pilot having a sharp cutting edge parallel to the axis of the pilot, extending longitudinally of the pilot, between and beyond the lands of the pilot, and projecting in a direction radial to the center of the pilot a distance equal to the radius of the lands.

6. In combination, a casing, a rotatable pilot having lands means for positioning the pilot axially relative to the casing, a fin on the pilot having a sharp cutting edge parallel to the axis of the pilot, extending longitudinally of the pilot, between and beyond the lands of the pilot, projecting in a direction radial to the center of the pilot a distance equal to the radius of the lands and tending upon rotation with the pilot to loosen or remove foreign matter from the wall of the casing, said fin adapted once in each revolution of the pilot to cause a centering of the pilot within the casing, and means for causing a continuous uniform rotation of the pilot within the casing, said last-named means independent of said first-named means.

In witness whereof, I have hereunto set my hand this 15th day of August, 1930.

JOSEPH C. ALBRIGHT.